Patented June 19, 1951

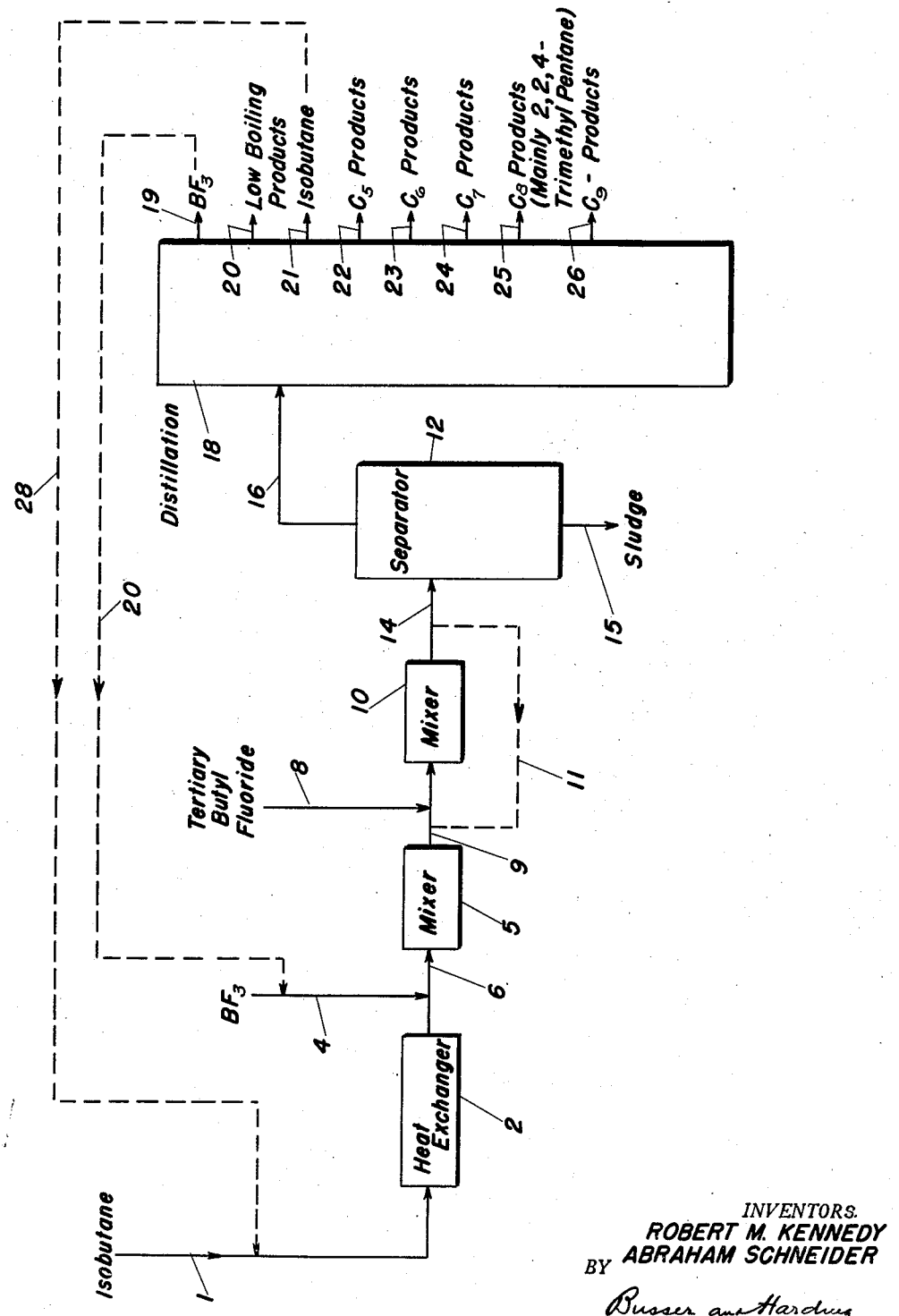

2,557,116

UNITED STATES PATENT OFFICE 2,557,116

PREPARATION OF 2,2,4-TRIMETHYL-PENTANE

Robert M. Kennedy, Newtown Square, and Abraham Schneider, Philadelphia, Pa., assignors to Sun Oil Company, Philadelphia, Pa., a corporation of New Jersey Application April 9, 1949, Serial No. 86,527

10 Claims. (Cl. 260—683.4)

This invention relates to the preparation of 2,2,4-trimethylpentane by the self-alkylation of isobutane under novel catalytic conditions.

2,2,4-trimethylpentane (isooctane) is of importance in the preparation of high anti-knock fuels for internal combustion engines, since it has a high octane rating, excellent rich mixture response, and suitable volatility characteristics.

The preparation of 2,2,4-trimethylpentane by alkylation reactions is well known, the usual reaction being between isobutane and isobutene under the catalytic influence of sulfuric acid or anhydrous hydrofluoric acid at temperatures of from $-10°$ C. to $30°$ C. Relatively large amounts of by-products are produced in this reaction, such as 2,4-dimethylhexane; 2,5-dimethylhexane; 2,3,4-trimethylpentane, and the like. Other catalysts which have been proposed heretofore for carrying out the alkylation of isoparaffins and olefins include aluminum chloride with a promoter such as HCl, $BF_3$—$H_2O$—Ni complexes and $BF_3$—$H_2O$—HF complexes.

The above described catalytic materials are insoluble in hydrocarbons, or at most are soluble only to a limited extent. When such catalysts are employed in conducting alkylation reactions, it is therefore necessary to effect intimate contact between the hydrocarbon phase and the catalyst phase, which usually requires provision of a mechanically agitated reactor for continuously agitating the reactants and catalyst during the reaction period. This adds considerably to the expense of the operation with respect both to installation charges and operating costs.

It has now been discovered that by employing novel catalytic conditions, as hereinafter fully described, 2,2,4-trimethylpentane can be prepared in good yield by the self-alkylation of isobutane, i. e., by the alkylation of isobutane by itself, the reaction being effected in homogeneous phase. The constituents of the catalyst are an alkyl fluoride and $BF_3$. Both of these materials are soluble in isobutane at least in the concentrations employed, so that the reaction does not depend upon contact between two separate phases.

The process of the present invention comprises bringing together an alkyl fluoride and $BF_3$ in the presence of isobutane at a suitable temperature whereby a catalytic condition becomes established which causes the immediate self-alkylation of isobutane. It appears that the catalytic effect is produced by the extraction of fluorine atoms from the alkyl fluoride by the $BF_3$, resulting in the formation of carbonium ions which initiate the alkylation reaction. As more fully described hereinafter, where the alkyl fluoride is a primary fluoride a temperature of at least $-10°$ C. is required to initiate this reaction. With secondary fluorides the reaction takes place to substantial extent down to temperatures as low as about $-90°$ C., while the tertiary fluoride the reaction begins to occur to substantial extent at temperatures as low as about $-120°$ C. In bringing together the alkyl fluoride and $BF_3$, the alkyl fluoride can be introduced into the isobutane to which $BF_3$ has already been added, or the $BF_3$ can be introduced into a solution of the alkyl fluoride in the isobutane, or both of the catalytic components can be introduced simultaneously but separately into the isobutene. It is also permissible first to dissolve each of the catalytic components in separate portions of isobutane, and then bring together the separate portions to effect reaction. It is not permissible, however, to premix the alkyl fluoride and $BF_3$ and then add the mixture to the isobutane, for in such case the catalytic conditions will be immediately spent when the alkyl fluoride and $BF_3$ are brought into contact with each other. The components of the catalyst and the isobutane form a homogeneous phase, irrespective of their mode of addition, so that reaction does not depend upon contact between separate phases, and hence the mechanical agitation required to provide contact between separate phases is unnecessary.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote the self-alkylation of isobutane to form 2,2,4-trimethylpentane.

The temperature at which such reaction will be obtained varies, however, with the particular alkyl fluoride employed. We have found that when the fluoride is a tertiary fluoride, the reaction begins to occur to a substantial extent at temperatures as low as $-120°$ C. When the alkyl fluoride is a secondary fluoride, the reaction takes place to a substantial extent at temperatures as low as $-90°$ C. At temperatures below this value, a secondary fluoride in combination with $BF_3$ has little catalytic effect. When the alkyl fluoride is a primary fluoride, the reaction temperature should be above $-10°$ C. in order to obtain substantial catalytic action. Ethyl fluoride, however, has been found to be more inert than the primary fluorides having three or more carbon atoms per molecule and requires a temperature of at least about +20° C. in order to give rise to substantial catalytic action. Methyl fluoride in combination with BF₃ does not give any substantial catalytic effect at least at temperatures below +150° C., and is not considered within the scope of the present invention.

The reaction may, if desired, be carried out at much higher temperatures than the minimum values above specified, and no definite maximum temperature can be given for all cases. In practice the maximum temperature which may be employed usually will depend upon the pressure under which the available equipment is adapted to operate or upon the desired degree of purity of the 2,2,4-trimethylpentane. As a general rule, it will be desirable to operate at all times at temperatures below +150° C. and usually well below this value, preferably below 50° C. A relatively low reaction temperature tends to suppress disproportionation and cleavage of the alkylate, with a resulting high proportion of C₈ isoparaffin (mainly 2,2,4-trimethylpentane). It is noteworthy, however, that the use of the present type of catalytic agents permits the self-alkylation of isobutane to be conducted over a much wider range of temperatures than are employed in the known alkylation processes using other catalysts.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes, and the like. As specific illustrations of secondary fluorides, the following may be mentioned: isopropyl fluoride; 2-fluoro-butane; 2-fluoro-3-methylbutane; and 2-fluoro-3,3-dimethylbutane. A few specific examples of tertiary fluorides are: t-butyl fluoride; t-amyl fluoride; 2-fluoro-2,3-dimethylbutane and other t-hexyl fluorides; t-heptyl fluorides; and 4-fluoro-2,2-4-trimethylpentane and other t-octyl fluorides. It will be understood that the specific compounds named above are given merely by way of illustration and that any alkyl fluoride (with the exception of methyl fluoride) will produce an operative catalytic combination with BF₃ provided the temperature is above the minimum values as set forth above.

In general, the maximum amount of isobutane which can be converted to other hydrocarbons per mole of alkyl fluoride used is two moles. However, it is preferred to employ an excess of isobutane, since excessive amounts of alkyl fluoride tends to promote isomerization, disproportionation, and cleavage of the product. The preferred molar ratio of alkyl fluoride to isobutane is from 1:2 to 1:10. The amount of BF₃ required to initiate the reaction is small and is not considered critical. From about 1 to 10 g. per 100 g. of isobutane is suitable and gives good results, but more or less may be employed.

In alkylation processes generally, some reactions other than the desired alkylation invariably occur, such as disproportionation, isomerization and cleavage. However, disproportionation, isomerization and cleavage of isobutane do not occur when it is treated with BF₃ and an alkyl fluoride, but the higher molecular weight products of the alkylation may undergo such reactions, as hereinbefore mentioned. Accordingly, the total reaction product contains other hydrocarbons in addition to the C₈ product of the isobutane self-alkylation. Relatively small amounts of C₆ and C₇ hydrocarbons are formed. Also, the product may contain a considerable amount of C₉ and heavier hydrocarbons. However, these other products of the reaction are also isoparaffins of highly branched structure and are likewise useful for preparing high quality fuels. Where it is desired to obtain the 2,2,4-trimethylpentane in high concentration, it may be separated from the other hydrocarbons by distillation. On the other hand, for the manufacture of aviation or other motor fuels, such separation is usually unnecessary, since the total hydrocarbon product, or so much thereof as has a suitable boiling range, and which contains a relatively high concentration of 2,2,4-trimethylpentane, may be used directly for such purpose.

It is noteworthy that the fraction of the reaction product of the present process contains a large proportion of 2,2,4-trimethylpentane. This is advantageous in that it readily permits the separation of the 2,2,4-trimethylpentane from the other hydrocarbon products in a high state of purity. By way of contrast, heretofore known alkylation processes for the preparation of 2,2,4-trimethylpentane generally yield the product in admixture with substantial amounts of other octanes, which may be of inferior anti-knock value.

The process of the present invention may be performed by batch, intermittent, or continuous process. The accompanying drawing is a diagrammatic flow-sheet illustrating one manner of conducting the process in a continuous manner.

Referring to the flow-sheet, isobutane enters the system through line 1 and flows through heat exchanger 2, which may be either a cooler or a heater, depending upon the temperature at which it is desired to conduct the reaction. On leaving heat exchanger 2, the isobutane is mixed first with one catalytic component and then with the other, or both may be introduced simultaneously but separately into the isobutane. For purpose of illustration, BF₃ is added to the isobutane first, through line 4, the isobutane containing BF₃ then passing into mixer 5 through line 6. It is apparent that if there is sufficient turbulence in line 6, mixer 5 may be omitted. The amount of BF₃ to employ is not critical, and a very small amount is sufficient, upon subsequent addition of alkyl fluoride, to establish the necessary catalytic condition.

After the addition of BF₃, the alkyl fluoride, tertiary butyl fluoride being used as illustrative, is introduced through line 8 into the BF₃-isobutane mixture flowing through line 9. The amount of alkyl fluoride to add will vary depending upon the other operating conditions, but generally will be within the range of 1 mole of alkyl fluoride to from 1 to 10 moles of isobutane.

A catalytic condition becomes established immediately upon mixing the tertiary butyl fluoride and BF₃, and self-alkylation of the isobutane starts immediately. The mixture passes through mixer 10 (which may be omitted if turbulence in the flow line is sufficient), and the self-alkylation proceeds rapidly under the catalytic influence of the BF₃-alkyl fluoride combination.

It is advantageous to recycle the reaction mixture from mixer 10 through line 11 back into line 9 while introducing the tertiary butyl fluoride through line 8 slowly relative to the rate of recycling. This insures against a high concentration of the tertiary butyl fluoride at the locus of its introduction into the reactants, which has been found to enhance the yield of 2,2,4-trimethylpentane.

Upon completion of the reaction, the mixture becomes heterogeneous due to separation of a sludge from the hydrocarbon phase. A stream of the reaction mixture is continuously withdrawn from mixer 10 through line 14 and is introduced into separator 12 wherein the two phases separate. The sludge settles to the bottom of the separator and is withdrawn through line 15. This material contains fluorine derived from the alkyl fluoride together with $BF_3$ in some sort of complex form. If desired, means (not shown) may be provided for recovering $BF_3$ from the sludge and re-using the same.

The hydrocarbon product is withdrawn from separator 12 through line 16 and is sent to distillation zone 18 for separation of the components. Distillation zone 18 will usually comprise a plurality of separate distillation steps suitable for making the separations indicated. The lowest boiling component will be any $BF_3$ which has remained dissolved in the hydrocarbon layer. As indicated, this $BF_3$ may be withdrawn through line 19 and recycled through line 20.

As shown by the drawing, the low boiling hydrocarbon constituents may be removed through lines 20 through 24, and the $C_8$ fraction containing a substantial portion of 2,2,4-trimethylpentane is removed through line 25. Higher boiling constituents are removed through line 26. It has been found that the alkyl fluoride employed will be converted, at least in part, during the reaction to the corresponding paraffin. Thus, if isopropyl fluoride is used, some propane will be removed through line 20. If tertiary butyl fluoride is used, it will be converted to isobutane, and is removed through line 21. This isobutane may be recycled to the process through lines 28 and 1.

The following examples illustrate specific embodiments of the present invention:

Example I

Two runs (A and B) were made at about −80° C., in which the alkyl fluorides used were, respectively, isopropyl fluoride and tertiary butyl fluoride. In run A a solution containing 27 g. isopropyl fluoride in 57 g. isobutane was slowly introduced into a solution of 8 g. of $BF_3$ in 51 g. of isobutane over a period of 1½ hours. In run B a solution containing 23 g. tertiary butyl fluoride in 36 g. isobutane was added to a solution of 10 g. $BF_3$ in 68 g. isobutane over a period of 35 minutes. In each case the resulting hydrocarbon layer was separated from the lower layer which precipitated, and components boiling below the $C_6$ range were removed from the hydrocarbon layer by evaporation. The resulting $C_6+$ product was distilled and the cuts were analyzed. Results were as follows:

|  | Run A | Run B |
| --- | --- | --- |
| Temperature, °C | −80 | −80 |
| Alkyl fluoride used | isopropyl | t-butyl |
| Yield of product: |  |  |
| Lower boiling product, g | 86 | 85 |
| $C_6+$ product, g | 28 | 16 |
| Analysis of $C_6+$ product, vol. per cent: |  |  |
| $C_6$ | [1] 9 | [1] 3 |
| $C_7$ | [2] 18 | [2] 3 |
| $C_8$ | [3] 35 | [4] 54 |
| $C_9$ and higher | 38 | 40 |

[1] Composed essentially of 2,3-dimethylbutane.
[2] Composed essentially of 2,3- and 2,4-dimethylpentane.
[3] Contained 55% 2,2,4-trimethylpentane.
[4] Contained 89% 2,2,4-trimethylpentane.

Example II

Two runs (A and B) were made in similar manner as in the preceding example except that a temperature of about 0° C. was used. In run A a solution of 40 g. isopropyl fluoride in 72 g. isobutane was introduced into a solution of 6 g. $BF_3$ in 96 g. isobutane over a period of 39 minutes. In run B a solution of 22 g. tertiary butyl fluoride in 52 g. isobutane was added to a solution of 9 g. $BF_3$ in 68 g. isobutane over a period of 1 hour. Results were as follows:

|  | Run A | Run B |
| --- | --- | --- |
| Temperature, °C | 0 | 0 |
| Alkyl fluoride used | isopropyl | t-butyl |
| Yield of product: |  |  |
| Lower boiling product, g | ---- | 95 |
| $C_6+$ product, g | 55 | 21 |
| Analysis of $C_6+$ product, vol. per cent: |  |  |
| $C_6$ | [1] 6.5 | [1] 5.4 |
| $C_7$ | [2] 13.2 | [2] 12.1 |
| $C_8$ | [3] 46.7 | [4] 47.9 |
| $C_9$ and heavier | 33.6 | 34.6 |

[1] Composed of about 80% 2,3-dimethylbutane and 20% 2-methylpentane.
[2] Composed of about 70% 2,4-dimethylpentane and 30% 2,3-dimethylpentane.
[3] Contained about 39% 2,2,4-trimethylpentane.
[4] Contained about 59% 2,2,4-trimethylpentane.

Example III

This example illustrates the use of a primary fluoride, namely, neohexyl fluoride (1-fluoro-3,3-dimethylbutane), in treating isobutane. At a temperature of about 25° C., a mixture comprising 46 g. isobutane and 21 g. neohexyl fluoride was slowly introduced into a solution of 8 g. $BF_3$ in 75 g. isobutane. After reaction 11 g. of lower layer and 135 g. of hydrocarbon layer were obtained. Isobutane and lower boiling components were evaporated from the hydrocarbon layer, leaving 33 g. of $C_5+$ product having the following composition:

|  | Vol. % of $C_5+$ product |
| --- | --- |
| $C_5$ (isopentane) | 12 |
| $C_6$ | [1] 24 |
| $C_7$ | 3 |
| $C_8$ | [2] 25 |
| $C_9$ and higher | 36 |

[1] Contained a large proportion of 2,3-dimethylbutane formed by a rearrangement of the neohexyl structure, and hence, in this case, the paraffin corresponding to the alkyl fluoride employed is not obtained in appreciable quantities.
[2] Contained about 42% 2,2,4-trimethylpentane.

The foregoing examples are given to illustrate the process of the present invention. Under similar conditions, the use of other alkyl fluorides, as hereinbefore described, gives substantially similar results, as do the use of other operating conditions within the ranges hereinbefore described.

This application is a continuation-in-part of our copending application, Serial No. 38,167, filed July 10, 1948.

We claim:

1. Method for the preparation of 2,2,4-trimethylpentane by the instantaneous self-alkylation of isobutane in homogeneous phase which comprises reacting isobutane with itself in the presence of a catalyst comprising an admixture of $BF_3$ and an alkyl fluoride having at least two carbon atoms per molecule at a temperature sufficient to effect said instantaneous homogeneous phase reaction, said temperature being in the range of from −120° C. to 150° C.

2. Method according to claim 1 wherein a $C_8$ fraction containing a substantial proportion of 2,2,4-trimethylpentane is separated from the reaction mixture.

3. Method for the preparation of 2,2,4-trimethylpentane by the instantaneous self-alkylation of isobutane in homogeneous phase which comprises introducing an alkyl fluoride having at least two carbon atoms per molecule into isobutane containing dissolved $BF_3$ at a temperature sufficient to effect said instantaneous homogeneous phase reaction, said temperature being in the range of from $-120°$ C. to $150°$ C.

4. Method for the preparation of 2,2,4-trimethylpentane by the instantaneous self-alkylation of isobutane in homogeneous phase which comprises introducing $BF_3$ into isobutane containing a dissolved alkyl fluoride having at least two carbon atoms per molecule at a temperature sufficient to effect said instantaneous homogeneous phase reaction, said temperature being in the range of from $-120°$ C. to $150°$ C.

5. Method for the preparation of 2,2,4-trimethylpentane by the instantaneous self-alkylation of isobutane in homogeneous phase which comprises reacting isobutane with itself in the presence of a catalyst comprising an admixture of $BF_3$ and a tertiary alkyl fluoride at a temperature sufficient to effect said instantaneous homogeneous phase reaction, said temperature being in the range of from $-120°$ C. to $150°$ C.

6. Method according to claim 5 wherein the alkyl fluoride is tertiary butyl fluoride.

7. Method for the preparation of 2,2,4-trimethylpentane by the instantaneous self-alkylation of isobutane in homogeneous phase which comprises reacting isobutane with itself in the presence of a catalyst comprising an admixture of $BF_3$ and a secondary alkyl fluoride at a temperature sufficient to effect said instantaneous homogeneous phase reaction, said temperature being in the range of from $-90°$ C. to $150°$ C.

8. Method according to claim 7 wherein the alkyl fluoride is isopropyl fluoride.

9. Method for the preparation of 2,2,4-trimethylpentane by the instantaneous self-alkylation of isobutane in homogeneous phase which comprises reacting isobutane with itself in the presence of a catalyst comprising an admixture of $BF_3$ and a primary alkyl fluoride having at least three carbon atoms per molecule at a temperature sufficient to effect said instantaneous homogeneous phase reaction, said temperature being in the range from $-10°$ C. to $150°$ C.

10. Method according to claim 9 wherein the alkyl fluoride is 1-fluoro-3,3-dimethylbutane.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,413,384 | Schmerling | Dec. 31, 1946 |